United States Patent [19]

Rayburn

[11] 4,127,891
[45] Nov. 28, 1978

[54] PLEATED METALLIZED FILM CAPACITOR WITH SPRAYED EDGE TERMINATIONS

[75] Inventor: Charles C. Rayburn, Mount Prospect, Ill.

[73] Assignee: Illinois Tool Works Inc., Chicago, Ill.

[21] Appl. No.: 814,958

[22] Filed: Jul. 12, 1977

[51] Int. Cl.$^2$ .......................................... H01G 1/147
[52] U.S. Cl. .................................. 361/309; 361/301; 361/304
[58] Field of Search ............... 361/301, 304, 303, 308, 361/309, 311

[56] References Cited

U.S. PATENT DOCUMENTS

| | | | |
|---|---|---|---|
| 2,470,826 | 5/1949 | McMahon | 361/301 |
| 2,919,390 | 12/1959 | Robinson | 361/301 X |
| 3,482,154 | 12/1969 | Robinson | 361/308 X |

FOREIGN PATENT DOCUMENTS 159,958  11/1954  Australia .................................. 361/301

Primary Examiner—E. A. Goldberg
Attorney, Agent, or Firm—Glenn W. Bowen; Robert W. Beart

[57] ABSTRACT

An electrical capacitor is formed utilizing a thin dielectric layer which is metallized on both sides to provide electrode areas. Unmetallized margin areas are provided on one side of the dielectric layer along the longitudinal edges of the layer, an unmetallized strip is provided in the center of the other side of the dielectric area which extends along the longitudinal dimension of the layer. The capacitor is formed by pleating, or folding, the dielectric layer along its longitudinal dimension an odd number of times, but with at least five pleat lines being formed and with one of the pleat lines being along the center of the dielectric layer so that the unmetallized strip is on the inside of the center pleat. The center pleat extends beyond the ends of the other pleats on one longitudinal edge of the capacitor while the ends of the metallized dielectric layer which contain the unmetallized margin areas extend beyond the ends of the pleats on the other longitudinal edge of the capacitor.

18 Claims, 12 Drawing Figures

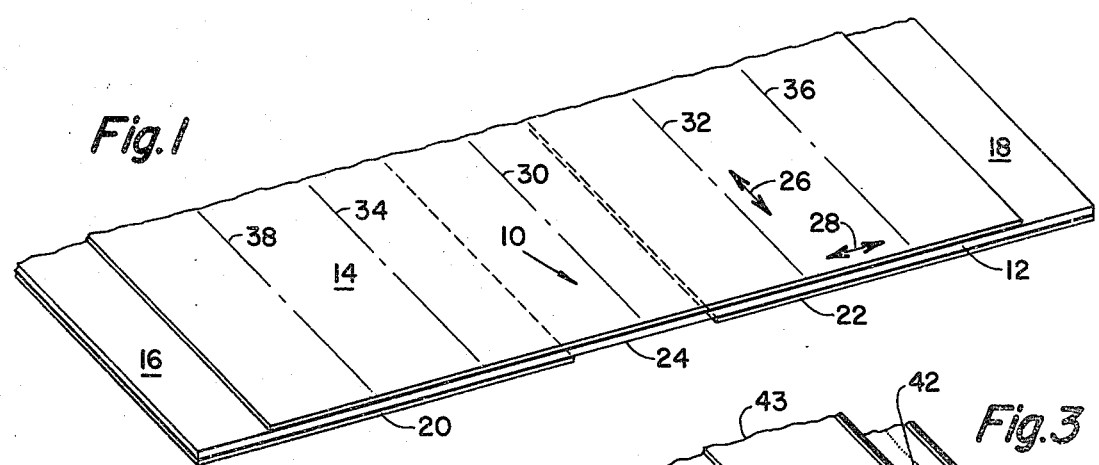
Fig.1
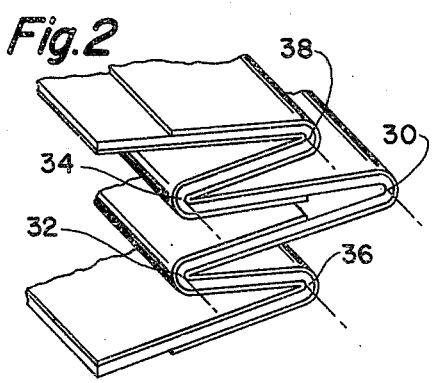
Fig.2
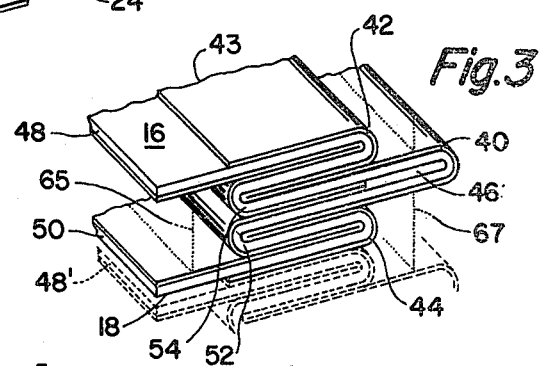
Fig.3
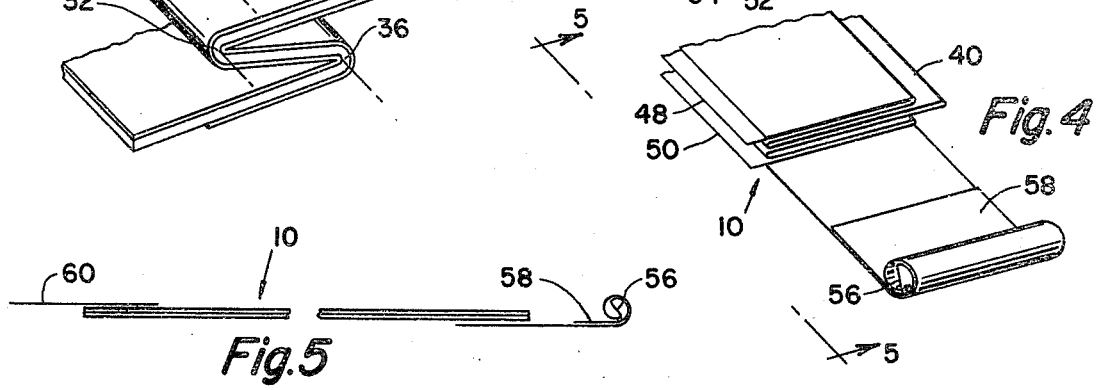
Fig.4
Fig.5
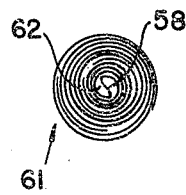  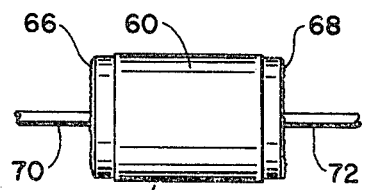 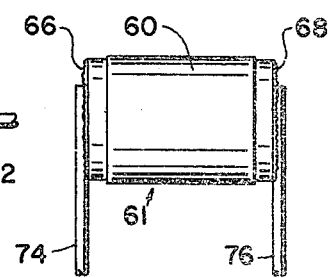
Fig.6  Fig.7  Fig.8  Fig.9

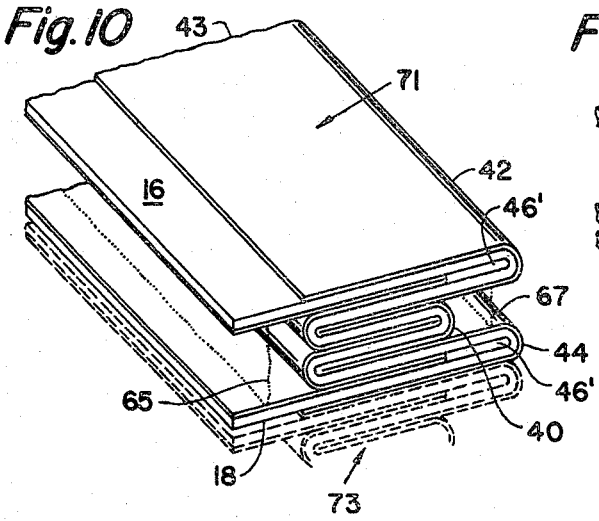
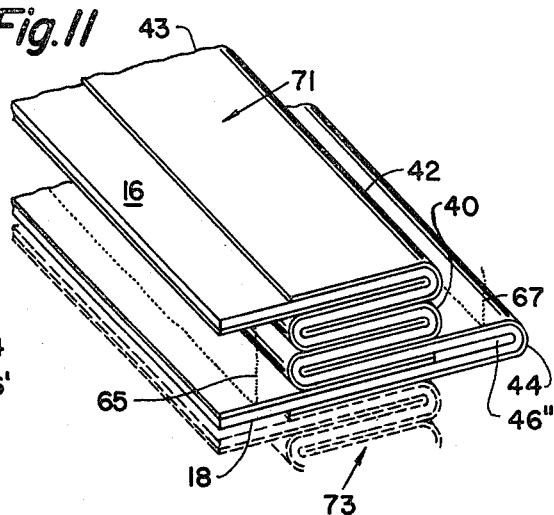
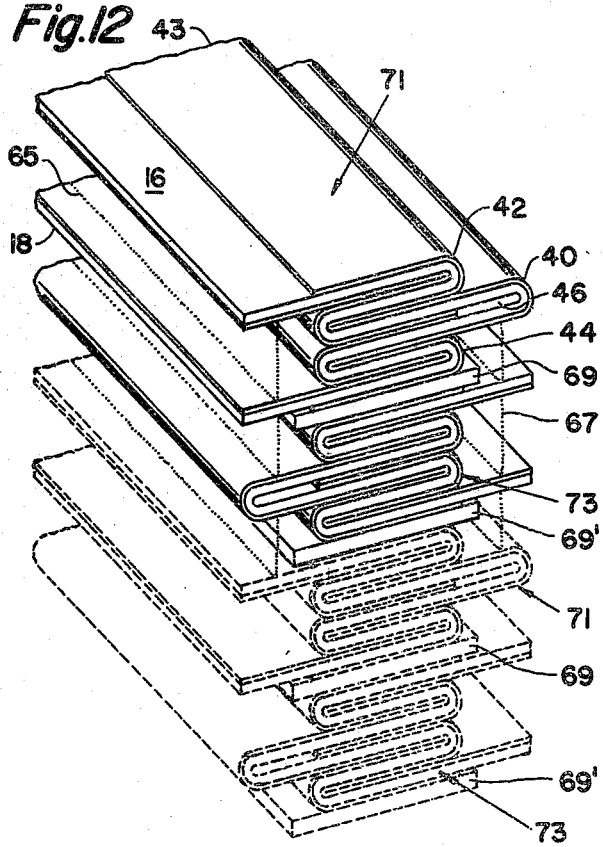

PLEATED METALLIZED FILM CAPACITOR WITH SPRAYED EDGE TERMINATIONS

BACKGROUND OF THE INVENTION

Electrical capacitors made of thin film dielectric material which is metallized on both sides are used in large quantities in electrical devices because of their reliability, their desirable electrical characteristics and their relatively low cost. U.S. Pat. No. 2,470,826 issued on May 24, 1949 to W. McMahon illustrates a capacitor in which a double sided metallized dielectric layer is folded an odd number of times in a longitudinal direction. The folded dielectric material may then be wound along its longitudinal dimension and end terminations may then be applied to it by spraying of metal against the edges of the wound capacitor segment. The type of capacitor described by McMahon patent is extremely desirable because substantially all of the dielectric layer of the capacitor is in the electric field and the capacitor may be made without the insertion of an additional dielectric layer in the main body of the capacitor, although a short initial unmetallized dielectric strip and a protective terminating dielectric strip may be employed with the capacitor, if desired.

The type of capacitor construction that is envisioned by McMahon patent has a number of decided manufacturing and electrical advantages. For example, the problem of masking the dielectric layer during electrode evaporation when the electrode areas are applied to the film is substantially reduced. In addition, no slitting is required as it is during the manufacture of conventional wound film capacitors. Furthermore, the capacitance per unit dielectric area is maximized because of the substantially full use of the dielectric layer in the electric field. Shorter winding lengths per unit capacitance are thereby required, reducing the winding labor. The dielectric lengths can also be calibrated and pre-cut to produce a capacitor of more accurate values. Another advantage of this type of capacitor is that there are no air layers between the metallized electrodes and the pleated film surfaces and this substantially increases the voltage, for example, 100 volts or more, at which corona discharge starts, making this capacitor commercially attractive for new applications such as fluorescent lighting circuits. Previously, 50 gauge film thickness or more was required of wound film capacitors to withstand the corona. With the capacitor of the present invention, 32 gauge or less dielectric film thickness may be utilized, making wound film capacitors economically feasible for such applications.

The McMahon patent suggested that leads could be attached to his capacitor by the well-known Schoop process. The application of high velocity metallic spray coatings to the edges of the capacitor described by McMahon is not commercially practical, however, because the spray will penetrate through the dielectric area at a pleat and thereby short one electrode to the other. If the temperature and pressure of the spray are lowered, penetration of the dielectric layers may be reduced but the adhesion of the metallic spray will generally be very poor. The multiple leads suggested in the McMahon patent also are not satisfactory since they tend to tear the dielectric material and to make the capacitor bulky and inductive.

In order to solve the above mentioned spray shorting problem at a pleated edge, it has been suggested in Australian Pat. No. 159,958, patented on Nov. 24, 1954 to provide unmetallized dielectric strips behind all of the pleats of a pleated metallized capacitor. While this solution may provide a technically feasible method of attaching leads to a pleated metallized dielectric layer capacitor, the number of unmetallized strips that are required on the dielectric layer greatly complicates the manufacturing process for both the dielectric layer itself and the pleated capacitor product. For example, in a capacitor having five pleats, there must be, in addition to the two unmetallized margin areas, five unmetallized strips that run along the entire length of the dielectric material, with three of these strips being on one side of the dielectric layer and two of these strips being on the opposite side of the dielectric layer. It is apparent that the masking problems and the cost of manufacturing such a specialized item make the solution of the Australian patent commercially unattractive. This is especially true since the type of metallized dielectric layer that is used in the capacitor of the present invention, (in which only the margin areas and one unmetallized central strip is required), is readily commercially available.

The configuration of the capacitor of the present invention provides a product which has all of the advantages of pleated, or pleated and wound, capacitor and also has the added advantage that it may be manufactured with commercially available metallized dielectric material. A further advantage of the present invention is that the same basic starting material may be used to manufacture capacitors having a number of different pleating combinations, which, of course, is not true for the capacitor of the Australian patent, in which each pleat combination requires a specially manufactured dielectric layer. In addition to the use of the present invention to manufacture wound film capacitors, it is also possible to utilize the invention to produce ceramic capacitors in which the capacitor dielectric material is folded while the ceramic material is still in a "green" state, in a manner similar to that disclosed in U.S. Pat. No. 3,223,494 issued Dec. 14, 1965 to J. W. Crownover.

DESCRIPTION OF THE DRAWINGS

The present invention is illustrated by reference to the drawings in which:

FIG. 1 is a perspective view of a portion of a metallized dielectric layer which may be used in the construction of the capacitor of the present invention;

FIG. 2 is a perspective view of a partially pleated metallized dielectric layer having five pleat lines;

FIG. 3 is a perspective view of a fully pleated dielectric layer in accordance with the present invention;

FIG. 4 is a perspective view of the fully pleated dielectric layer of FIG. 3 which, in addition, shows a winding mandrel and an unmetallized dielectric insert;

FIG. 5 is a diagrammatic showing of the winding of a capacitor segment in accordance with the construction of FIG. 4;

FIG. 6 is an end view of a capacitor segment, before lead attachment, that is wound in accordance with the showing of FIGS. 4 and 5;

FIG. 7 is an end view of the wound capacitor segment of FIG. 6 after it has been pressed into an oval shape;

FIG. 8 is a side view of a completed capacitor following the attachment of axial leads;

FIG. 9 is a side view of a completed capacitor following attachment of radial leads;

FIG. 10 is a perspective view of an alternate version of a capacitor constructed in accordance with the present invention;

FIG. 11 is a perspective view of an additional alternate embodiment; and

FIG. 12 is a perspective view of still another alternate embodiment.

TECHNICAL DESCRIPTION OF THE INVENTION

A portion of a commercially available metallized dielectric strip which may be unwound from a reel, that is suitable for a making of a capacitor in accordance with the present invention is shown in FIG. 1. The metallized dielectric strip is formed with a dielectric layer 12 of a thin film dielectric material, such as polyester, polypropylene, polystyrene, polycarbonate or other suitable material. A thin metallized electrode layer 14 is applied to the upper surface of the dielectric layer 12 in such a fashion that unmetallized margin areas 16, 18 extend along the longitudinal edges of the strip 10. Two thin metallized electrode areas 20, 22 are applied to the lower surface of the dielectric layer 12 so that the metallized layer 20 extends to the left hand margin of the layer as shown in FIG. 1, while the metallized layer 22 extends to the right hand margin of the layer. A central unmetallized strip 24 lies between the metallized electrode areas 20, 22.

In the embodiment shown in FIG. 1, the longitudinal dimension of the metallized strip 10 is shown along the arrows 26 while the narrow transverse dimension is shown along the arrows 28. The capacitor is pleated along the imaginary line 30 which extends through the length of the unmetallized central strip 24. The capacitor of the present invention, however, is not limited to one in which folding is along longitudinal lines since a capacitor could be made in accordance with the present invention by pleating along transverse lines if the appropriate corresponding metallized and unmetallized areas were provided.

A partially pleated capacitor is shown in FIG. 2 wherein one pleat occurs along the longitudinal center line 30 and other pleats occur along the longitudinal pleat lines 32, 34, 36 and 38. It is to be noted that lines 32, 34, 36 and 38 are spaced so that the center pleat 40 extends beyond the other pleats 42, 44 that run along the right hand longitudinal edge of the metallized strip 10 of FIG. 1 so that the inside of the pleat 40 in the area 46 is unmetallized. The extension of the center pleat 40 beyond the pleats 42, 44 is preferably at least 0.020 inches. In addition, it is noted that the pleats are positioned so that the longitudinal ends 48, 50 of the metallized strip 10 are aligned with each other but so that they extend beyond the pleats 52, 54 that run along the left hand longitudinal edge of the metallized strip. Again, the extension of the ends 48, 50 beyond the pleats 52, 54 is preferably at least 0.020 inches. The unmetallized margin 16, therefore, faces upwardly while the unmetallized margin 18 faces downwardly when the capacitor segment has been fully pleated as shown in FIG. 3.

After the capacitor has been processed to form the capacitor segment shown in FIG. 3, a number of different additional processing steps may be undertaken. For example, the pleated capacitor segment of FIG. 3 could be used to form a capacitor merely by spraying the right and left hand longitudinal edges of the segment with a metallized spray, such as babbitt or other suitable metal, in accordance with conventional practice, and then electrical leads could be secured to them, for example, by soldering. Alternately, the capacitor segment of FIG. 3 could be cut along a transverse line, such as the line 43, and a number of such segments could be stacked upon each other, with the terminal end 50 of one capacitor segment being adjacent to and aligned with the terminal end 48' of the capacitor segment that is positioned immediately below it, as shown diagrammatically by the dotted line respresentative of FIG. 3, and then their ends could be sprayed with a metallized spray and leads could then be secured to the stacked array of such segments. In conjunction with the presently preferred embodiment of the present invention, however, FIG. 3 represents two layers of a capacitor segment formed by winding of the dielectric strip along the longitudinal dimension of the strip 10, as shown in FIGS. 4 and 5, to form a wound capacitor. Another version of this capacitor could be achieved, however, by pleating the capacitor segment of FIG. 3 a number of times transversely along transverse fold lines such as the line 43, or alternately pleating several times, and then completing the segment by winding the remainder of the length of the dielectric strip.

The winding of the capacitor segment of FIG. 3 into a wound capacitor may be achieved with various winding techniques, including the use of a removable split mandrel such as the mandrel 56 of FIG. 4 and 5. An unmetallized dielectric strip 58 is desirably initially wound around the mandrel to protect the metallized electrode areas of the metallized strip 10. Near the completion of winding, an additional unmetallized dielectric strip 60 is desirably wound into the structure to form an outer protective coating. The dielectric strip 60 may also be heat-sealed to itself to form the pleated capacitor segment 61 which is shown in FIG. 6. The removal of the mandrel 56 from the capacitor segment 61 leaves an opening 62 in the unit. The opening 62 may be closed by applying pressure, or pressure and heat, in accordance with the type of dielectric used and conventional manufacturing techniques, to the capacitor segment 61 so that it assumes an oval shape as shown in FIG. 7.

Once the capacitor segment of the embodiment of FIGS. 4 through 7 has been wound, a metallized spray may then be directed against the longitudinal edges of the unit in accordance with conventional processing techniques to interconnect the electrode layers along these edges and to provide for the connection of electrical leads to the unit. The metallized spray will penetrate into the open area between the ends 48 and 50 on the left hand longitudinal edge of the capacitor segment, as shown diagrammatically in FIG. 3 to a depth such as that indicated by the plane 65. The plane 65 indicates the maximum depth that any high velocity spray particles will penetrate and it may thus be located any place between the ends 48 and 50 of the metallized strip 10 and the edges of the pleats 52, 54. Accordingly, the metallized spray material will extend into the left hand opening of the capacitor between the ends 48, 50 far enough to make contact to the two facing metallized electrode areas 20, 22, but not so far that it will penetrate through the dielectric material at the pleats 52, 54. The configuration of the present invention thus provide for reliable lead termination at the left hand longitudinal edge of the capacitor segment of FIG. 3 without the necessity of providing unmetallized longitudinal strips along the inside of the pleats 52, 54, thereby saving considerable processing expenses in the manufacture of completed capacitors of this type.

Termination to the right hand longitudinal edge of the capacitor segment of FIG. 3 is similarly provided by a metallized spray which extends over the protruding center pleat 40 to a depth, such as that indicated by the plane 67, which is sufficient to allow the metallized spray to make good contact to the electrode area 14, but which will prevent the penetration of the spray metallic particles through the dielectric at the pleats 42, 44. The location of the plane 68 may be anywhere between the edges of the pleats 42, 44 and the edge of the pleat 40 as long as there is sufficient depth of spray to provide adequate contact termination to the electrode area 14. Again, a considerable cost savings is achieved by the present invention since the pleats 42, 44, like the pleats 52, 54, did not have to be provided with their own unmetallized strips. It will be noted in the present invention that only one unmetallized strip 24 is required in the center of the metallized strip 10, and, thus, the same general pattern may be used for various pleat configurations and a separate individually configured metallized strip is not required for each pleat pattern as would be with the prior art structure of the previously mentioned Australian patent.

Once the metallic spray has been applied to the edges of the capacitor segment of FIG. 7, either radial or axial leads may be applied to it. For example, axial leads 70, 72 with conventional spiral "pig-tail" ends (not shown) may be soldered, arc-welded or connected by other means to the sprayed edge termination layers 66, 68 at the ends of the wound film capacitor segment 61, as shown in FIG. 8. Alternately, radial leads 74, 76 may be soldered, arc-welded or connected by other methods to the sprayed metallized layers 66, 68 if a radial leaded capacitor is desired, as shown in FIG. 9.

It will be noted from the foregoing description that the number of pleats that may be used to form the capacitor of the present invention is M where M = 5 + (N)4 and N may be 0 or any positive integer. The number of pleats M in a capacitor made in accordance with the present invention, therefore, will always be an odd number.

Other alternate versions of the present invention are shown in FIGS. 10-12. In FIG. 10 the pleated capacitor segment is formed so that the end pleats 42, 44 have unmetallized strips 46' behind these pleats while the center pleat 40 does not. The two end pleats 42, 44 extend beyond the recessed center pleat 40. This version is less desirable, however, than the version of FIG. 3 because it requires an additional strip.

Another alternate embodiment is shown in FIG. 11 wherein only one of the end pleats 42 extends beyond the center pleat 40 and the other of the end pleats 44. In this version only one unmetallized strip 46" is required behind the extending end pleat 42, but the charging path is longer for this configuration than that of FIG. 3.

Still another alternate embodiment is shown in FIG. 12 which differs from the version shown in FIG. 3 in that intermediate dielectric layers 69, 69' are inserted between alternating groups 71, 73 of pleated layers with the center pleat extended, as in FIG. 3, but with the alternating groups 71, 73 facing in opposite directions. If the capacitor of FIG. 12 is to be a wound embodiment, the alternating groups 71, 73 of pleated layers which face in opposite directions may be supplied from a different pleated segment supply. Also, it is apparent that the groups of pleated layers shown in FIGS 10 and 11 could be employed to form a capacitor in accordance with the teaching of FIG. 12 by facing alternating groups of these layers in opposite directions and by separating these alternating groups with dielectric material.

The previously described embodiments of the present invention are illustrative, but not exhaustive, of the various types of configurations that may come within the scope of the present invention.

What is claimed is:

1. An electrical capacitor segment comprising at least one group of pleated layers comprising a dielectric layer, a first metallized electrode layer applied to one side of said dielectric layer so that an unmetallized margin extends along each edge of a pair of parallel edges of said dielectric layer, second and third metallized electrode layers applied to the other side of said dielectric layer so that a centrally located unmetallized strip runs between said second and third metallized layers, said dielectric layer being pleated M number of times where M = 5 + (N)4 and N may be zero or any positive interger so that the center pleat of said pleated dielectric strip extends along one end of said pleated dielectric layer beyond the other pleats that extend along the same end as said center pleat while the edges of said metallized dielectric strip which contain said margins extend along the opposite end of said pleated dielectric layer beyond the other pleats that extend along the same end as said margin containing edges and metallized spray material sprayed against both of said ends, but without penetration of said spray far enough to contact any of said pleats except said center pleat.

2. An electrical capacitor segment as claimed in claim 1, wherein a lead is secured to each of said metallized sprayed ends of said capacitor segment.

3. An electrical capacitor segment as claimed in claim 1, wherein said dielectric layer is an elongated layer and said capacitor segment is wound along the elongated dimension of said layer subsequent to said pleating along longitudinal pleat lines and said metallized sprayed material is applied to the ends of said capacitor after said winding has been completed.

4. An electrical capacitor segment as claimed in claim 3, wherein a lead is secured to each of said metallized sprayed ends of said capacitor segment.

5. An electrical capacitor segment as claimed in claim 3, wherein said dielectric layer is an elongated layer and said capacitor segment is pleated along lines transverse to the elongated dimension of said layer subsequent to said pleating along longitudinal pleat lines and said metallized sprayed material is applied to the ends of said capacitor after said pleating has been completed.

6. An electrical capacitor segment as claimed in claim 5, wherein a lead is secured to each of said metallized sprayed ends of said capacitor segment.

7. An electrical capacitor comprising a plurality of capacitor segments that are stacked upon each other wherein each capacitor segment comprises a dielectric layer, a first metallized electrode layer applied to one side of said dielectric layer so that an unmetallized margin extends along each edge of a pair of parallel edges of said dielectric layer, second and third metallized electrode layers applied to the other side of said dielectric layer so that a centrally located unmetallized strip runs between said second and third metallized layers said dielectric layer being pleated M number of times where M = 5 + (N)4 and N may be zero or any positive interger so that the center pleat of said pleated dielectric strip extends along one end of said pleated dielectric layer beyond the other pleats that extend along the same end as said center pleat while the edges of said metallized dielectric strip which contain said margins extend along the opposite end of said pleated dielectric layer beyond the other pleats that extend along the same end as said margin containing edges and metallized spray material sprayed against both of said ends, but without penetration of said spray far enough to contact any of said pleats except said center pleat.

8. An electrical capacitor segment as claimed in claim 7, wherein a lead is secured to each of said metallized sprayed ends of said capacitor segment.

9. An electrical capacitor as claimed in claim 7, wherein alternating ones of said plurality of capacitor segments face in opposite directions and are separated from their neighboring segments by dielectric material.

10. An electrical capacitor segment comprising at least one group of pleated layers comprising a dielectric layer, a first metallized electrode layer applied to one side of said dielectric layer so that an unmetallized margin extends along each edge of a pair of parallel edges of said dielectric layer, a pair of metallized electrode layers on the other side of said dielectric layer, and at least one unmetallized strip that runs between said metallized layers, on the other side of said dielectric layer, said dielectric layer being pleated M number of times where $M = 5 + (N)4$ and N may be zero or any positive integer so that at least one pleat of said pleated dielectric strip extends along one end of said pleated dielectric layer beyond at least one other pleat that extends along the same end as said extending pleat, or pleats, with all of said extending pleats having unmetallized strips behind them along their length, while the edges of said metallized dielectric strip which contain said margins extend along the opposite end of said pleated dielectric layer beyond the other pleats that extend along the same end as said margin containing edges and metallized spray material sprayed against both of said ends, but without penetration of said spray far enough to contact any of said pleats except said extending pleat or pleats.

11. An electrical capacitor segment as claimed in claim 10, wherein a lead is secured to each of said metallized sprayed ends of said capacitor segment.

12. An electrical capacitor segment as claimed in claim 10, wherein said dielectric layer is an elongated layer and said capacitor segment is wound along the elongated dimension of said layer subsequent to said pleating along longitudinal pleat lines and said metallized sprayed material is applied to the ends of said capacitor after said winding has been completed.

13. An electrical capacitor segment as claimed in claim 12, wherein a lead is secured to each of said metallized sprayed ends of said capacitor segment.

14. An electrical capacitor segment as claimed in claim 12, wherein said dielectric layer is an elongated layer and said capacitor segment is pleated along lines transverse to the elongated dimension of said layer subsequent to said pleating along longitudinal pleat lines and said metallized sprayed material is applied to the ends of said capacitor after said pleating has been completed.

15. An electrical capacitor segment as claimed in claim 14, wherein a lead is secured to each of said metallized sprayed ends of said capacitor segment.

16. An electrical capacitor comprising a plurality of capacitor segments that are stacked upon each other wherein each capacitor segment comprises a dielectric layer, a first metallized electrode layer applied to one side of said dielectric layer so that an unmetallized margin extends along each edge of a pair of parallel edges of said dielectric layer, a pair of metallized electrode layers on the other side of said dielectric layer, at least one unmetallized strip that runs between said metallized layers on the other side of said dielectric layer, said dielectric layer being pleated M number of times where $M = 5 + (N)4$ and N may be zero or any positive integer so that at least one pleat of said pleated dielectric strip extends along one end of said pleated dielectric layer beyond at least one other pleat that extends along the same end as said extending pleat, or pleats, with all of said extending pleats having unmetallized strips behind them along their length, while the edges of said metallized dielectric strip which contain said margins extend along the opposite end of said pleated dielectric layer beyond the other pleats that extend along the same end as said margin containing edges and metallized spray material sprayed against both of said ends but without penetration of said spray far enough to contact any of said pleats except said extending pleat or pleats.

17. An electrical capacitor segment as claimed in claim 16, wherein a lead is secured to each of said metallized sprayed ends of said capacitor segment.

18. An electrical capacitor as claimed in claim 16, wherein alternating ones of said plurality of capacitor segments face in opposite directions and are separated from the neighboring segments by dielectric material.

* * * * *